United States Patent Office 3,806,494
Patented Apr. 23, 1974

3,806,494
POLYAMIDOXIME AND IMIDAZOLE POLYMERS
Carl N. Zellner, New Hope, Pa., assignor to
Celanese Corporation, New York, N.Y.
No Drawing. Continuation-in-part of application Ser. No. 85,750, Oct. 30, 1970. This application Aug. 4, 1972, Ser. No. 277,957
Int. Cl. C08g 20/32
U.S. Cl. 260—78 TF    6 Claims

ABSTRACT OF THE DISCLOSURE

Process for the preparation of polymers which comprises reacting at temperatures of from about 0° to about 250° C. an aromatic diamine with a bis(hydroxamoyl halide)-bis(carboxylic acid) or a derivative thereof to form a polyamidoxime, which may then be subjected to ring closing conditions to form poly(bisbenzimidazobenzophenanthroline) (BBB) type polymers. Formation of the polyamidoxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine. The ring closure may be conducted in the presence of a catalyst at temperatures of from about 0° to about 250° C. or by reaction with an aromatic sulfonyl halide at temperatures of from about 0° to about 90° C. Reactive amine or hydroxamoyl halide terminal groups of the polyamidoximes or BBB type polymers may be reacted with other compounds or polymers which contain groups reactive therewith in order to further extend the polymer chains. In a preferred prior step, aromatic bis(hydroxamoyl halide)-bis(carboxylic acid) reactants are made by the reaction of dialkyl-dicarboxy aromatic precursors with, e.g., nitrosyl halide. Novel polyamidoximes.

CROSS REFERENCE TO RELATED APPLICATION

This is a continuation-in-part of U.S. application Ser. No. 85,750, filed Oct. 30, 1970.

This invention relates to a novel process for the preparation of polyamidoximes and to poly(aroylenebenzimidazoles) or, more particularly, to poly(benzimidazobenzophenanthroline) (BBB) type polymers produced therefrom.

Polyamidoximes are useful as chelating agents for sequestering polyvalent metal ions in plating baths, polluted streams, etc. The polymers are also useful as catalyst carriers and as ion-exchange resins. The polymers may be formed into fibers, films, molded articles, etc. Instead of undergoing ring closure to form the BBB type polymers of this invention, the polyamidoximes may be hydrolyzed to high performance polyamides by reaction with, e.g., dilute hydrochloric acid, or their oxime groups may be hydrogenated under appropriate conditions to amine groups to form polyamines, which are also useful as chelating agents. The polyamines may be reacted with polyepoxides to form epoxy resins and molded articles, or they may be crosslinked with dicarboxylic acids to form polyamide resins of interesting and varied properties.

The BBB polymers of this invention generally are useful for applications where high performance polymers are required. For example, in aerospace applications where retention of strength at elevated temperatures and flame retardancy are required, the BBB polymers of this invention are especially outstanding. Heretofore, Nomex® polyamide type resins have been used in coveralls, etc., worn by pilots and race car drivers to protect against injuries from fires resulting from crashes, etc. Unfortunately, Nomex® garments are not as non-flammable as desired. In addition, wearers of these garments have complained that they are clammy, especially when worn in a closed cockpit. BBB type polymers are much less flammable than Nomex® resins. Garments made from BBB type polymers are not clammy, especially when the fabric in the garment is woven from staple, which fabric has the feel of cotton.

Heretofore, BBB type polymers have been made by the reaction of diaminobenzidine with a tetracarboxylic acid or a derivative thereof. Overall this process is undesirable because it is expensive and also because of toxicity problems. The diaminobenzidine is difficult to synthesize and difficult to purify, thereby resulting in a very expensive starting material. This compound is also highly toxic. The other starting material is usually a tetracarboxynaphthalene, which is also relatively expensive because it is not, as of now, an article of commerce. Another drawback to the prior art process is that relatively high temperatures are required, e.g., temperatures in the range of about 390° C.

One or more of the foregoing and other adverse effects of the prior art process are overcome by the novel process of the present invention.

Generally, the process of the present invention comprises reacting an aromatic diamine with a bis(hydroxamoyl halide)-bis(carboxylic acid) to form the polyamidoxime, which may then be subjected to ring closing conditions to form the BBB type polymers of this invention.

Illustrative of the aromatic diamines which may be used in the present invention are those which may be depicted by the following general formula:

$$\text{H—N(H)—Y—N(H)—H},$$

wherein Y is $-C_6H_4-$, $-C_{10}H_6-$, $-C_{14}H_8-$, $-C_6H_4-C_6H_4-$, $-C_6H_4-R-C_6H_4-$, wherein R is as defined below, and the like. Y may be substituted with groups which do not detrimentally interfere with the reaction.

Illustrative subcategories of the diamines which may be used are:

(I) Compounds of the general formula $$\text{H—N(H)—Z—N(H)—H},$$

wherein Z is $-C_6H_4-$, $-C_{10}H_6-$, $-C_{14}H_8-$;

(II) Compounds of the general formula $$\text{H—N(H)—C}_6\text{H}_4-\text{C}_6\text{H}_4\text{N(H)—H}$$

(III) Compounds of the general formula $$\text{H—N(H)—C}_6\text{H}_4-\text{R—C}_6\text{H}_4\text{N(H)—H}$$

wherein R may be

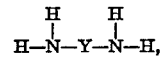

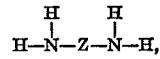

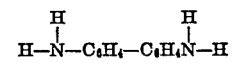

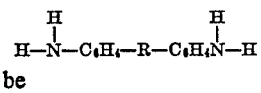

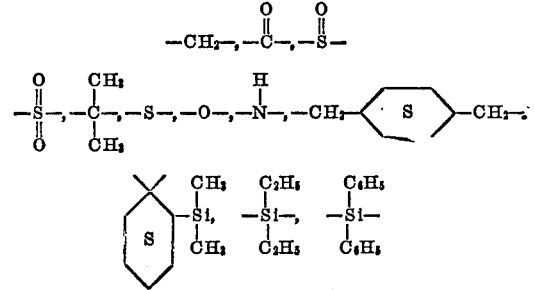

or the like.

Illustrative of particular aromatic diamines which may be used in the process of this invention are the following:

m-phenylene diamine
p-phenylene diamine
o-phenylene diamine
1,4-naphthalene diamine
1,5-naphthalene diamine
1,6-naphthalene diamine
1,7-naphthalene diamine
1,8-naphthalene diamine
2,3-naphthalene diamine
2,6-naphthalene diamine
2,7-naphthalene diamine
1,4-diamino-2-methyl-naphthalene
1,4-diamino-anthracene
2,6-diamino anthracene
9,10-diamino-anthracene
9,10-diamino-phenanthrene
2,2'-diamino-biphenyl
2,4'-diamino-biphenyl
3,3'-diamino-biphenyl
3,4'-diamino-biphenyl
4,4'-diamino-biphenyl
4,4'-diamino-2,2'-dimethyl-biphenyl
1,1-bis(4-aminophenyl) cyclohexane
bis(4-aminophenyl)dimethyl silane
bis(4-aminophenyl) diethyl silane
bis(4-aminophenyl) diphenyl silane
bis(4-aminophenyl) amine
bis(4-aminophenyl) ether, i.e., 4,4'-diamino diphenyl ether
bis(4-aminophenyl) thioether
2,2-bis(4-aminophenyl) propane
bis(4-aminophenyl) sulfone
bis(4-aminophenyl) sulfoxide
bis(4-aminophenyl) ketone
bis(4-aminophenyl) methane.

By the term "aromatic diamine" is meant a compound in which the two amino groups are each attached to an aromatic ring, not necessarily both attached to the same ring, however. Generally, any aromatic diamine containing up to about 30 carbon atoms can be used in the present invention. Preferably, the diamine contains up to about 20 carbon atoms, most preferably up to about 15 carbon atoms. The most preferred diamines are benzidine and oxydianiline.

Bis(hydroxamoyl halide)-bis(carboxylic acids) which may be used in this invention contain aromatic nuclei and may be, e.g., to the chlorides, bromides or iodides. The chlorides and bromides are generally preferred. The compounds are illustrated by the following formula:

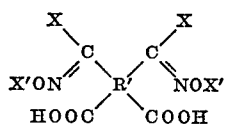

wherein X is halogen or —OR", —SR" (R" is alkyl of up to 4 carbon atoms) or —OC$_6$H$_5$; and R' is a tetravalent carbocyclic (rings formed only of carbon) aromatic radical or an aromatic radical having a bridge group joining two carbocyclic aromatic radicals as described above and having a total of 4 valence positions whether R' is a bridged carbocyclic aromatic radical or a plain carbocyclic aromatic radical, and wherein said valence positions are attached to the carbocyclic ring. The bridge groups are divalent in character and may be selected from the following:

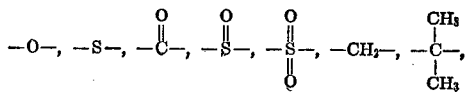

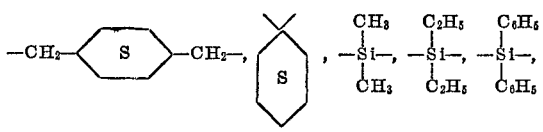

and the like.

In the R' radical its valences are so positioned that a carbohydroxamoyl halide group

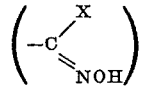

and a carboxy group are attached together through a chain of two or three carbon atoms of the R' radical (the three carbon linkage is preferred), and the remaining carbohydroxamoyl halide and carboxyl groups are similarly linked together, although not necessarily through the same two or three carbon atoms of R'; and X' is hydrogen or an

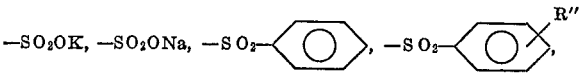

(R" is alkyl of up to 4 carbon atoms),

group.

Illustrative of the aromatic groups represented by R' are:

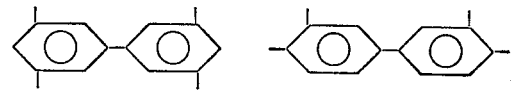

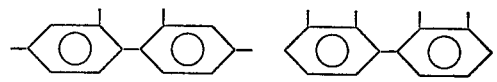

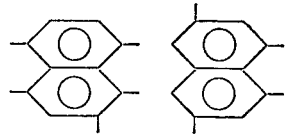

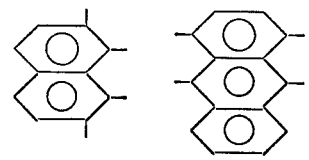

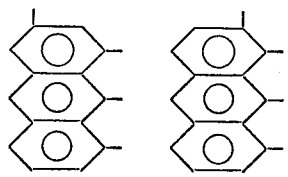

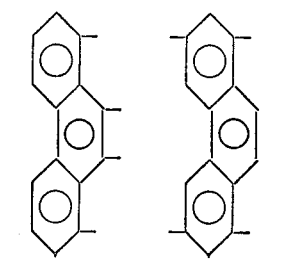

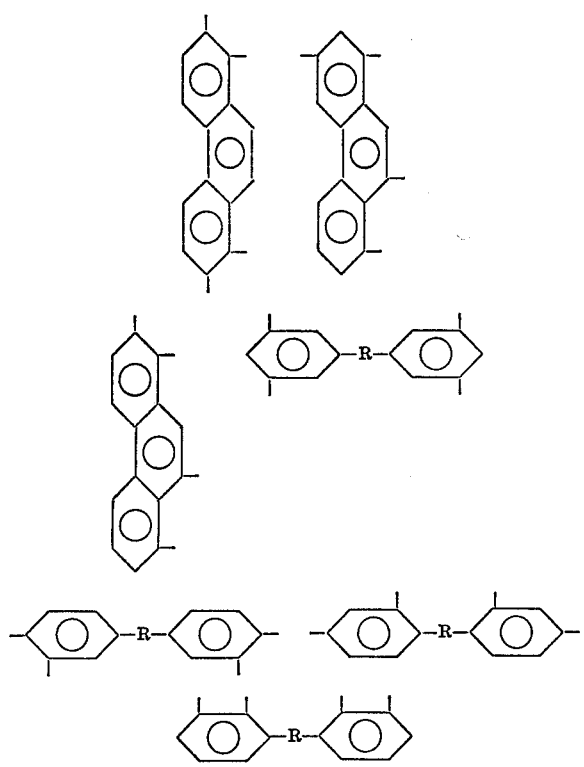
wherein R is
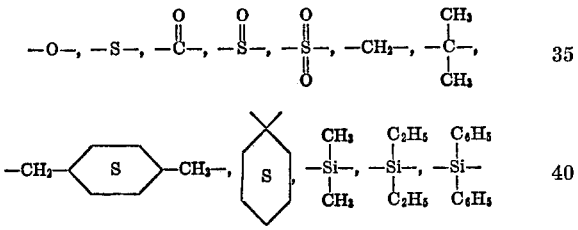
and the like. It is preferred R' contain up to about 18 carbon atoms.
R' is preferably
most preferably with the free valences in the 1, 4, 5, 8- positions.
Illustrative of particular bis(hydroxamoyl halides) are the following:
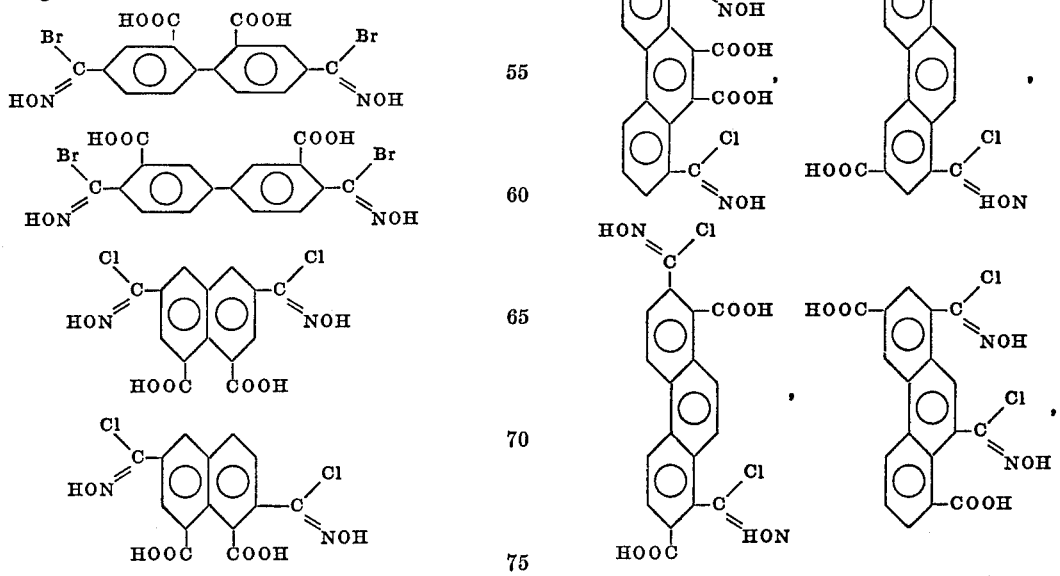

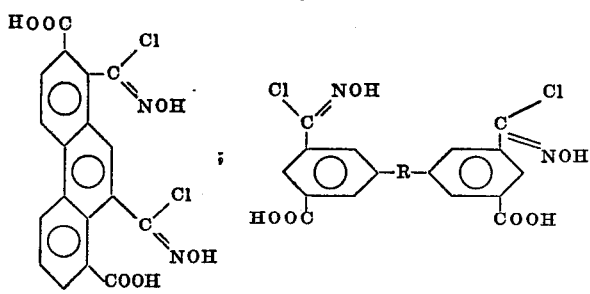

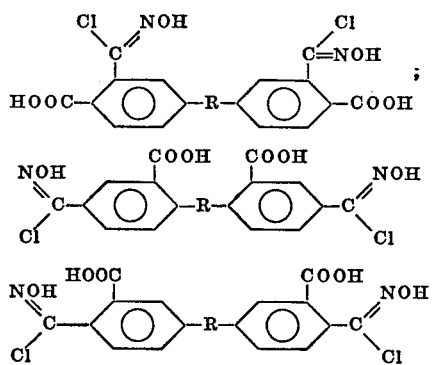

Illustrative compounds containing the R radical are the following:

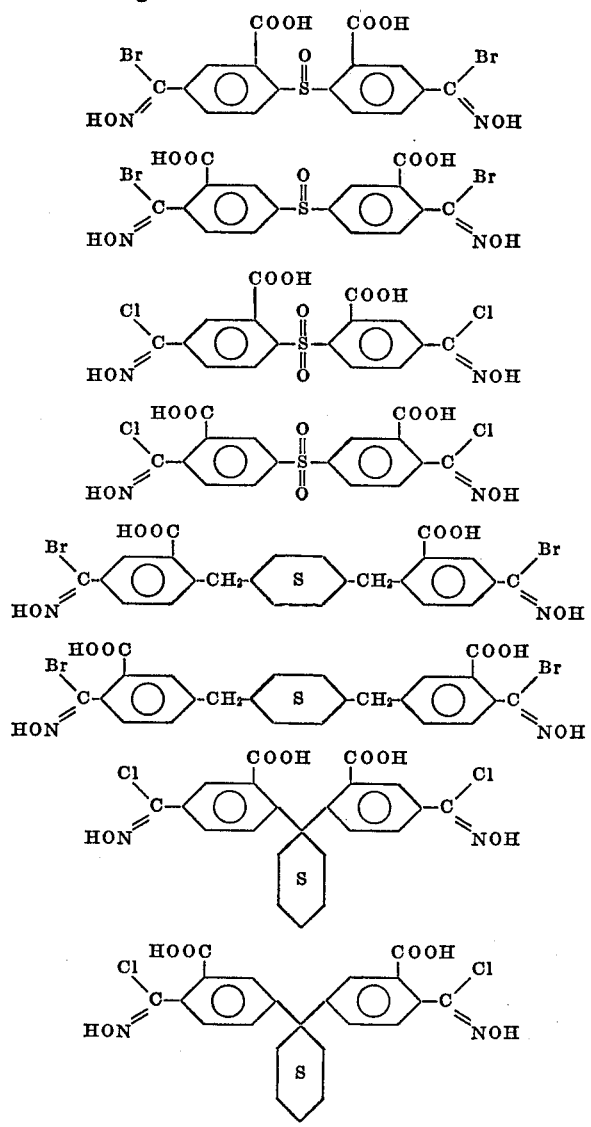

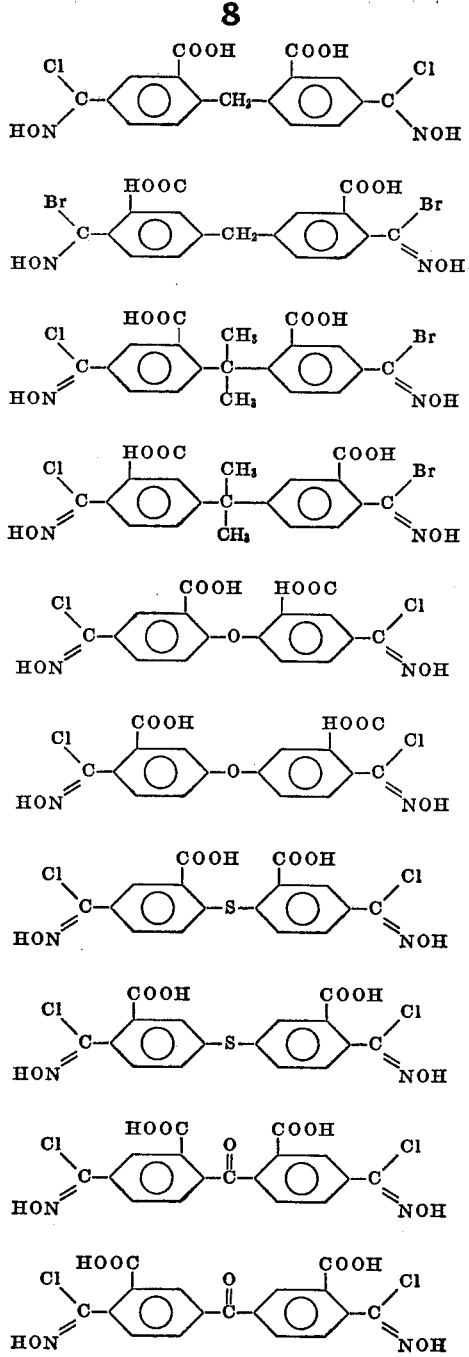

Generally, equimolar quantities of the reactants are used to form the polymers of this invention. However, it is possible to terminate the polymer chains with either hydroxamoyl halide groups or amino groups merely by utilizing in the reaction an excess of the reactant containing either of those groups. To obtain relatively high intrinsic viscosity polymer, it is generally preferred that the excess not exceed about 5 mole percent.

When the polymer is terminated by hydroxamoyl halide groups, they may be reacted with compounds or polymers containing at least one group, preferably two groups, which is (are) reactive therewith under the conditions of the reaction. Such groups may be, for example, amines or phenoxides.

When an excess of the diamine is used, the excess will function as an acid-acceptor. Excess diamine may also function as chain-stoppers, or end-blocking units, the terminal amine groups of which may serve as reactive groups through which the chain may be further extended by reaction with other compounds containing at least one group, preferably two groups, which is (are) reactive with the amine groups under the reaction conditions. Such groups and compounds are, for example, hydroxamoyl halide; isocyanate; halogen, e.g., chlorine and bromine; epoxide; acid chlorides, e.g., adipoyl chloride; carboxy, e.g., adipic acid, tetracarboxy-naphthalene; amine (condensation reaction); SO₂Cl₂; phosgene (to form a urea linkage or to form isocyanate groups depending on reaction conditions, which latter groups may be converted to urethane linkages by reaction with polyols); hydrazine (to form semicarbazides); phosgenated diols (aliphatic or aromatic bis-chlorocarbonates [to form urethane linkages]).

Of course, it will be obvious to one skilled in the art that mixed polymers may be produced by polymerizing more than one of either or each of the two reactants. These mixed polymers may be either random or alternating and may be formed from using mixtures of different species of either or both reactants, or they may be block polymers, which may be formed by reacting an amine-terminated polymer of relatively low molecular weight which has itself been formed from a diamine or bis(hydroxamoyl halide)-bis(carboxylic acid) which is different from that used to form the first polymer. The relatively low molecular weight polymers may instead be substantially the same except for one being amine-terminated and the other hydroxamoyl halide terminated, and possible differences in molecular weight and configuration.

In addition to polymers having various mixed polyamidoxime repeating units, polymers containing repeating units of other types of polymers such as polyesters, polyamides, and the like may also be prepared. These polymers may be prepared by reacting, for example, an amine-terminated polyester with a hydroxamoyl halide terminated polymer of relatively low molecular weight which has itself been formed from a diamine or bis(hydroxamoyl halide)-bis(carboxylic acid) which is different from that used in the first polymer. Amine-terminated polyesters may be prepared for example, by utilizing a relatively low molecular weight acid terminated polyester polymer (prepared by well-known methods) and then reacting the resulting polymer with a large excess of diamine. The preparation of amine-terminated polyamides is likewise well known. In general, then, the amine-terminated polymers can be prepared by carrying out a polymerization reaction and then endcapping the resulting polymer with an amine using standard methods. Similarly hydroxamoyl halide terminated or endcapping polymers such as polyesters may be prepared and further reacted with aromatic diamines to form the compositions of this invention.

Cyclization of the polyamidoxime polymers may be accomplished before or after linking in the manner just described. If cyclization is to be performed before linking, the terminal amino groups may need protection, e.g., by acetylation, before cyclization is conducted. After cyclization, the protected groups are reconverted to amine groups by hydrolysis before linking.

Although the two reactants could be directly contacted together, especially when one or both are liquids or when the reaction temperature is high enough to melt one or both, it is preferable to conduct the reaction in the presence of a solvent. The solvent may be inert or may function as an acid-acceptor to remove the by-product hydrogen halide formed during the reaction.

Illustrative of the inert solvents which may be used are N₂O₄; acetonitrile; nitrated solvents, e.g., nitromethane and nitrobenzene; chlorinated solvents, e.g., methylene chloride, chloroform, carbon tetrachloride, ethylene chloride, and chlorobenzene; the ethers, e.g., tetrahydrofurane, diethyl ether, and dioxane; the esters, e.g., amyl acetate; the lactones, e.g., butyrolactone; ketones, e.g., cyclopentanone, cyclohexanone; acetic acid; polyphosphoric acid and cresols. Cyclohexanone and polyphosphoric acid are preferred.

If an inert solvent has been used, it is desirable to add to the mixture an acid-acceptor such as a tertiary amine, e.g., trialkylamines such as trimethylamine, triethylamine, and the like triethylene diamine; 1,3 dimethylamino butane; heterocyclic amines such as pyridine, picolines, lutidines; or an alkali metal or alkaline earth metal hydroxide, bicarbonate, carbonate, or alkanoate (up to 4 carbon atoms), e.g., sodium hydroxide, sodium carbonate, sodium bicarbonate, potassium acetate, etc.

Particularly useful acid-acceptors are those insoluble in the reaction mixture, e.g., melamine, benzoguanamine, dicyanamide, insoluble guanidine derivatives, insoluble basic ion-exchange resins. Preferred are melamine and benzoguanamine. Of course, mixtures of the acid-acceptors may be used. The aforementioned acid-acceptors may be used in conjunction with the following solvents which also function as acid-acceptors.

Illustrative of the solvents which also function as acid-acceptors are dimethylacetamide (DMAc), dimethylformamide (DMF), pyrrolidone, and its alkylated derivatives, e.g., N-methyl-pyrrolidone, dimethyl sulfoxide (DMSO), hexamethylphosphoramide, dialkylanilines, e.g., dimethylaniline and diethylaniline, and the like, DMAc is preferred.

In place of a single solvent in the reaction mixture, there may be used mixed solvent systems containing either or both types of solvents.

In order to avoid undesirable side reactions, it is preferable to use either an acid-acceptor which is insoluble in the reaction mixture, preferably melamine, or to use a soluble amine but ensure that its instantaneous concentration in the reaction mixture is relatively low, e.g., lower than 0.01 molar concentration—for example, by slowly and continuously adding the acid-acceptor or by incrementally adding small portions.

The reaction of the bis(hydroxamoyl halide)-bis(carboxylic acid) with the aromatic diamine is generally exothermic and may be conducted at autogenous temperature, or it may be conducted at a constant temperature by the application of the required cooling or heating conditions. The reaction may be conducted at temperatures of from about 0° to about 250° C., preferably about 0° to about 100° C.

The closing of the ring to actually form the imidazole polymers may be accomplished by the appropriate thermal conditions, e.g., by heating the amidoxime polymer to a temperature in the range of about 0° to 250° C., preferably in the presence of a catalyst, especially an acidic catalyst such as silica gel, silica-alumina, sulfonated polystyrene ion-exchange resins, and polyphosphoric acid. Polyphosphoric acid is the preferred catalyst.

Ring closure may also be accomplished by the reaction of the amidoxime polymer with sulfonyl halide, such as benzene sulfonyl chloride, naphthalene sulfonyl chloride, toluene sulfonyl chloride, methane sulfonyl chloride, or other ring closing reagents under appropriate conditions, e.g., about 0° C. to about 90° C. or higher, preferably about 5° C. The aromatic sulfonyl halides are preferred, especially toluene sulfonyl chloride.

The polyamidoximes prepared according to the instant invention, have recurring units of the following formula:

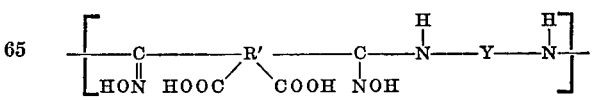

In the above formula R' is a tetravalent carbocyclic (having rings formed only of carbon) aromatic radical or an aromatic radical having a bridge group joining two carbocyclic aromatic radicals as described above and having a total of 4 valence positions whether R' is a bridged carbocyclic aromatic radical or a plain carbocyclic aromatic radical and wherein said valence positions are attached to the carbocyclic ring. The bridge groups are divalent in character and may be selected from the following:

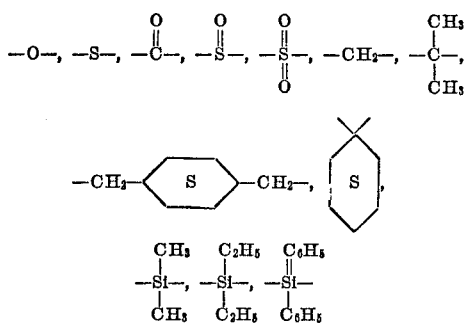

and the like.

In the R' radical, its valences are so positioned that a carbohydroxamoyl halide group

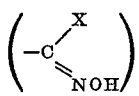

and a carboxyl group are attached together through a chain of two or three carbon atoms of the R' radical (the three carbon linkage is preferred), and the remaining carbohydroxamoyl halide and carboxy groups are similarly linked together, although not necessarily through the same two or three carbon atoms of R'. Illustrative R' groups have previously been described. It is preferred that R' contains up to 18 carbon atoms (most preferably about 10 carbon atoms). R' is preferably $C_{10}H_4$, most preferably with the 3 valences in the 1, 4, 5, 8-positions.

In the above formula Y is $—C_6H_4—$, $—C_{10}H_6—$,

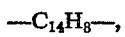

$C_6H_4—C_6H_4—$, $—C_6H_4—R—C_6H_4—$, wherein R is

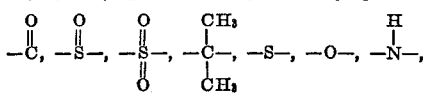

Preferred among the amidoximes are those wherein Y is selected from

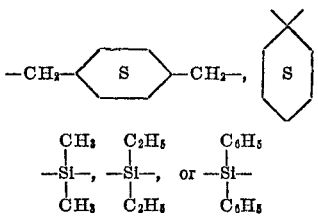

The most preferred polyamidoxime has the following formula:

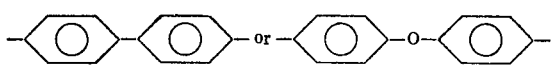

Imidazole polymers can, as has previously been described, be prepared by the process of the instant invention. Generally, they should have the following formula:

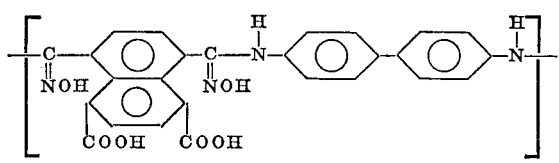

In this formula R' has been described for the generally described amidoxime polymers. Y is a derivative of the Y described for the polyamidoxime polymers but is a tetravalent radical with its 4 valences so positioned that one set of two valences from adjacent carbon atoms links those carbon atoms to the two respective nitrogen atoms.

Relative to the imidazole polymers, Y is selected from $C_6H_2$, $C_{10}H_4$, $C_{14}H_6$, $C_6H_3—C_6H_3$, $C_6H_3—R—C_6H_3$, wherein R is as defined below and the like. Y may be substituted with groups which do not detrimentally interfere with reaction. In the above formula R may be

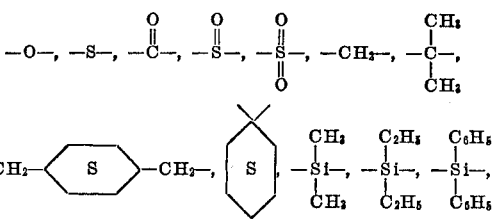

and the like.

In the above formula, Y is $—C_6H_4—$, $—C_{10}H_6—$, $—C_{14}H_8—$, $—C_6H_4—$, $—C_6H_4—$, $—C_6H_4—R—C_6H_4—$, and the like. R may be

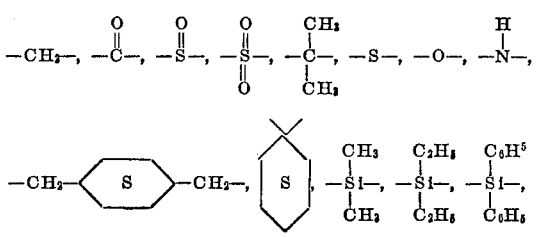

or the like.

The aromatic diamines are either readily available or easily prepared by methods which are well known to those skilled in the art. For example, benzidine may be prepared by the palladium-catalyzed hydrogenation in alkaline medium of nitrobenzene to form hydrazobenzene, which is then rearranged in the presence of, e.g., hydrochloric acid to form the desired product.

The bis(hydroxamoyl halide)-bis(carboxylic acid), the other reactant in the novel process of this invention, may be prepared by any of the routes which suggest themselves to one skilled in the art. For example, it is known that aldehyde groups in an appropriate aliphatic or aromatic dialdehyde may be reacted with hydroxylamine to form the corresponding bisoxime, which in turn may be reacted with halogen to form a bis(hydroxamoyl halide). Another method of preparing the bis(hydroxamoyl halides) is to start with the appropriate dialkyl-dicarboxy aromatic precursor and react it with nitrosyl halide, preferably in the presence of additional halogen, to form the bis(hydroxamoyl halide)-bis(carboxylic acids). Other reagents which may be used in place of the nitrosyl halide per se are a combination of nitric acid and hydrohalic acid, or a combination of nitric oxide (NO) and halogen.

The dialkyl-dicarboxy aromatic precursors are either known compounds or may be prepared by any convenient method known to those skilled in organic synthesis. The precursors may generally be prepared by Diels-Alder synthesis either alone or together with other readily apparent synthetic steps. The Diels-Alder synthesis is generally based on readily available starting materials and their simpler Diels-Alder adducts. The following illustrative synthesis sequence shows the preparation of one preferred precursor:

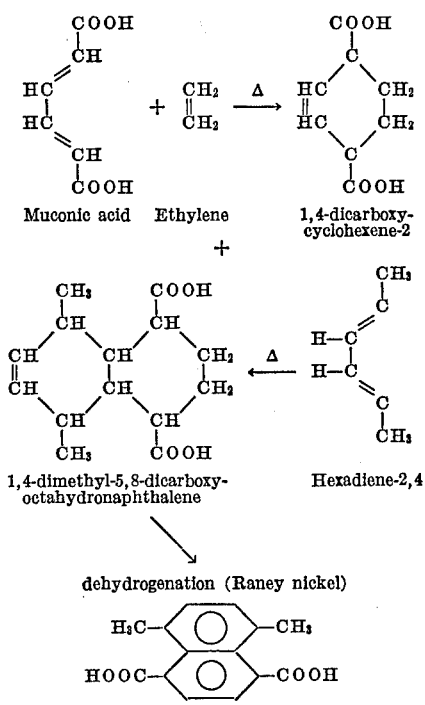

The reaction of an appropriate dialkyl dicarboxy aromatic precursor with nitrosyl halide or any one of its aforementioned alternatives, is the preferred method for the preparation of the bis(hydroxamoyl halide)-bis(carboxylic acids). For example,

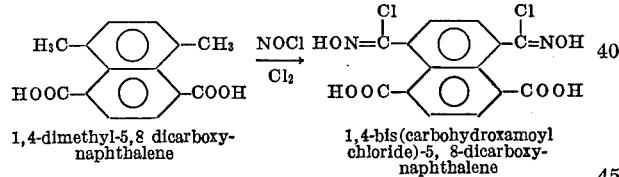

Instead of the aromatic reactant used in the above illustration, one may use an aromatic reactant corresponding to the desired aromatic bis(hydroxamoyl halide)-bis(carboxylic acids) described above. This preferred step in combination with the basic process of this invention, i.e., the reaction of the bis(hydroxamoyl halide)-bis(carboxylic acid) with an aromatic diamine results in a relatively simple, easy, relatively inexpensive, overall process for the preparation of polyamidoximes from readily available starting materials. These polyamidoximes may be converted to BBB type polymers by a ring closure reaction.

The preferred process for the preparation of bis(hydroxamoyl halide) - bis(carboxylic acids) may be conducted at temperatures of from about $-10°$ C. or lower to about $50°$ C. or higher. The reaction may be conducted at pressures in the range of an atmosphere or more, e.g., up to about 10 atmospheres, preferably from about one to about 5 atmospheres. In view of the corrosive nature of some of the reactants and products, such as nitrosyl halide, it is preferred to conduct the reaction in a reactor fabricated from a material which is inert under the reaction conditions, for example, a glass-lined reactor or one fabricated from titanium or nickel.

To enable the reader to more easily visualize the steps of the invention, the following schemata are set forth, using illustrative reactants. It will be readily apparent to the reader, however, that the other reactants mentioned throughout the specification and claims may be used in their stead.

PREPARATION OF AMIDOXIME POLYMER FROM BIS(HYDROXAMOYL CHLORIDE)-BIS(CARBOXYLIC ACID)

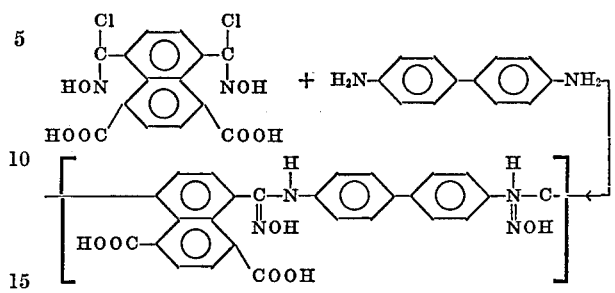

It is possible that a bis(hydroxamoyl halide)-bis(carboxylic acid) may decompose in the presence of certain acid-acceptors in accordance with the following illustrative reaction:

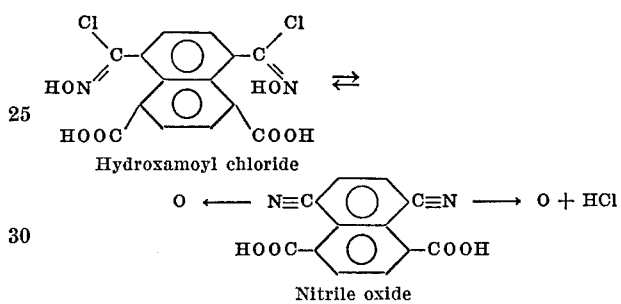

In order to inhibit or eliminate this side reaction, other alternative reactants may be used in place of this bis-(hydroxamoyl halide) in the reaction to form amidoxime polymers, e.g., the O-sulfonate derivatives, which may be formed in accordance with the following illustrative schemes.

PREPARATION OF O-SULFONATES OF (BIS) HYDROXAMOYL CHLORIDES

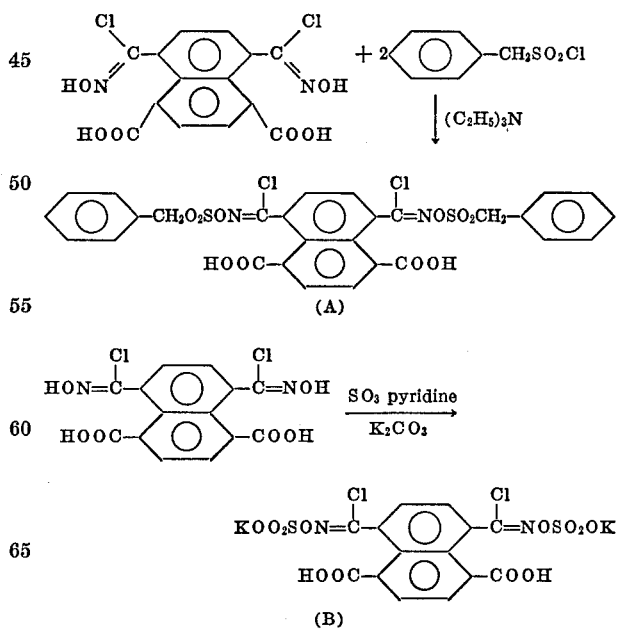

The products in (A) or (B) can be reacted with aromatic diamines to give amidoxime-O-sulfonate polymers which can then be converted to BBB type polymers in manners analogous to those illustrated above wherein bis-(hydroxamoyl halide)-bis(carboxylic acids) have been exemplified as the starting materials.

PREPARATION OF IMIDAZOLE POLYMER FROM AMIDOXIME POLYMER

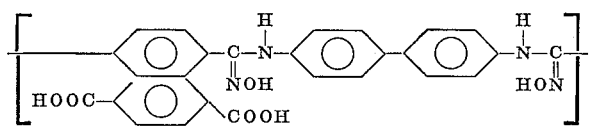

PREPARATION OF BBB FROM IMIDAZOLE POLYMER

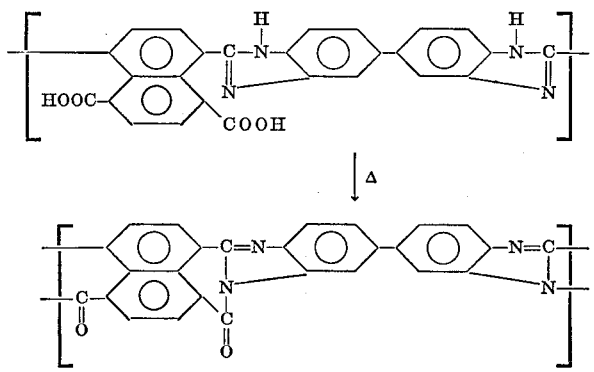

The reaction above may be conducted at elevated temperature, e.g., temperatures up to about 390° C., preferably up to about 300° C. More specific methods are given in examples I, II and III, which follow.

The following examples are illustrative of the invention:

EXAMPLE I

A volume of 100 mls. of DMAc dried over Linde sieves was purged with dry nitrogen. A weight of 3.71 grams (0.01 mole) of 1,4-bis(carbohydroxamoylchloride)-5,8-dicarboxy naphthalene is dissolved in the dry DMAc. To this solution are added 1.84 grams (0.01 mole) of benzidine. While stirring at about 40° C., a weight of 2.52 grams (0.2 mole) of melamine is added in small portions over the course of two hours. Stirring is continued for another two hours, during which the reaction mixture thickens as melamine hydrochloride and the polyamidoxime come out of solution.

The reaction mixture is added to cold water, and the polymer is filtered and washed thoroughly with hot water, to remove melamine hydrochloride, and then with alcohol and ethyl ether.

The polyamidoxime is dissolved in 40 mls. of dry pyridine and the solution cooled in an ice-bath. A weight of 3.81 grams (0.02 mole) of toluene sulfonyl chloride dissolved in 20 mls. of benzene and 10 mls. of pyridine chloride is added with stirring and cooling. The mixture is allowed to stand at 0° C. overnight to effect ring closure of the polyamidoxime to polynaphthimidazole.

The ring closure of the polynaphthimidazole to give BBB polymer can be effected in a number of ways, the most convenient of which is to heat to reflux in DMAc or DMSO for 2 to 3 hours. Or, the polymer may be heated to about 170° C. in conc. sulfuric acid or polyphosphoric acid for a few hours. The BBB is separated by cooling the solution and precipitating with water, washing and drying.

EXAMPLE II

To a reaction flask equipped with stirrer, nitrogen bubbling tube and dropping funnel are added 100 mls. of dry cyclohexanone. A slow nitrogen flow is started to drive air from the system before adding reactants. A weight of 3.71 grams (0.01 mole) of 1,4-bis(carbohydroxamoyl chloride)-5,8-dicarboxy naphthalene is added. A weight of 2.00 grams (0.01 mole) of oxydianiline is added in portions over the course of one hour at room temperature. At this point, addition of melamine in small portions is begun and is continued for another two hours at room temperature, the total weight of melamine added being 2.52 grams (0.02 mole). The mixture thickens gradually over the next 10 hours. The reaction mixture is added to water, and the polyamidoxime is filtered, washed and dried. The polymer is dissolved in 30 mls. dry pyridine, to which a cooled solution of 3.81 grams (0.02 mole) of toluene sulfonyl chloride in 20 mls. benzene and 10 mls. pyridine is added. After standing overnight at 0° to +5° C., the polynaphthimidazole is isolated, washed and dried.

This polymer is now added to 50 mls. conc. sulfuric acid and the solution heated to 170° for three hours. If desired, this solution may be used directly for spinning into a BBB fiber, or the polymer may be precipitated, washed and dried as before.

EXAMPLE III

A solution of 7.42 grams (0.02 mole) of 1,4-(biscarbohydroxamoyl chloride)-5,8-dicarboxy naphthalene in 100 mls. dry N-methyl pyrrolidone is prepared, after purging the system with dry nitrogen. To this solution, 3.96 grams (0.02 mole) of p,p'-diamino diphenylmethane are added with stirring at 30°–40° C. After about 7 hours of stirring, the mixture is cooled to 5° C., and a cooled solution of 7.62 grams (0.04 mole) of toluene sulfonyl chloride in 50 mls. of dry pyridine is added. The mixture is placed in a refrigerator for 12 hours and is then poured into water, filtered and washed with hot water, alcohol and ether.

The polynaphthimidazole is added to 100 mls. of DMAc containing 5% LiCl and ring closure is effected by refluxing for about 3 hours. On cooling, the BBB type polymer is separated, washed and dried.

EXAMPLE IV

Preparation of 1,4-bis(carbohydroxamoyl)-5,8-dicarboxy naphthalene

A mixture of nitrosyl chloride and chlorine is generated from concentrated nitric and hydrochloric acids:

The NOCl and $Cl_2$ are passed into a vessel containing a solution 1,4-dimethyl-5,8-dicarboxy naphthalene in carbon tetrachloride. A UV lamp irradiates the reaction mixture, maintained at 15° C., during continuous introduction of gaseous NOCl and $Cl_2$.

The 1,4-bis(carbohydroxamoyl)-5,8-dicarboxy naphthalene is largely insoluble in the medium and is filtered off and recrystallized from chloroform. The unchanged dimethyl starting material plus by-products can be retreated for further conversion to product.

An alternate starting material (1,4-bischloromethyl-5,8-dicarboxy naphthalene) for the above reaction can be prepared as follows: Naphthalene (80 g.), aqueous 40% formaldehyde (220 g.), and conc. HCl are refluxed 16 hours while passing a stream of HCl gas through the mixture. Crude bis-chloromethyl naphthalene (19 g.) is largely the 1,4-derivative which is purified by recrystallization. 1-chloromethyl naphthalene (43 g.) is recycled to the next run. The 1,4-bischloromethyl derivative is oxidized to 1,4-dicarboxy naphthalene with alkaline permanganate. Repetition of the above chloromethylation procedure on 1,4 dicarboxy naphthalene gives crude 1,4-bischloromethyl-5,8-dicarboxy naphthalene which is purified and subjected to reaction with NOCl and $Cl_2$.

What is claimed is:
1. A polyamidoxime polymer consisting essentially of recurring units of the formula:

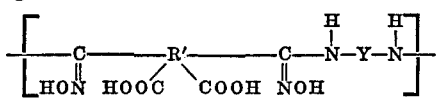

wherein R' is a tetravalent carbocyclic aromatic radical or an aromatic radical having a divalent bridge group selected from divalent radicals having the following formula:

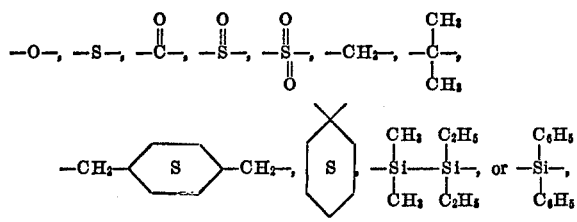

joining two carbocyclic aromatic radicals which radicals have the total of four valence positions, none of which are present on said bridge group and wherein said valences are so positioned that each carboxime group and the carboxy group closest to it are attached together through a chain of two or three carbon atoms of the R' radical; and Y is $-C_6H_4-$, $-C_{10}H_6-$, $-C_{14}H_8-$, $-C_6H_4-C_6H_4-$ $-C_6H_4-R-C_6H_4-$, wherein R is

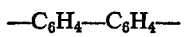

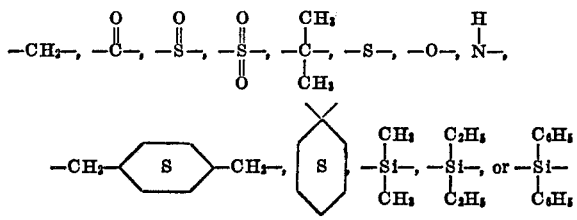

2. The polyamidoximes of claim 1 wherein R' is a tetravalent aromatic radical containing up to about 18 carbon atoms.
3. The polyamidoximes of claim 1 wherein R' contains 10 carbon atoms.
4. The polyamidoximes of claim 1 wherein Y is either

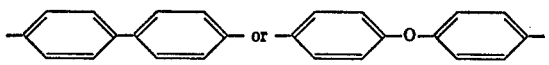

5. The polyamidoximes of claim 1 consisting essentially of recurring units of the formula:

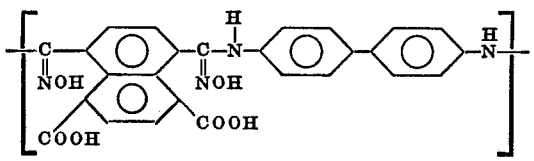

6. An imidazole polymer consisting essentially of recurring units of the formula:

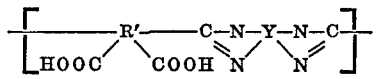

wherein R' is a tetravalent carbocyclic aromatic radical or an aromatic radical having a divalent bridge group selected from divalent radicals having the following formula:

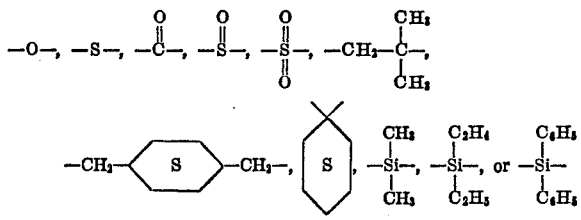

joining two carbocyclic aromatic radicals which radicals have the total of four valence positions, none of which are present on said bridge group and wherein said valences are so positioned that each carboxime group and the carboxy group closest to it are attached together through a chain of two or three carbon atoms of the R' radical; and Y is $-C_6H_4-$, $-C_{10}H_6-$, $-C_{14}H_8-$, $-C_6H_4-C_6H_4-$ $-C_6H_4-R-C_6H_4-$, wherein R is

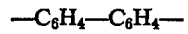

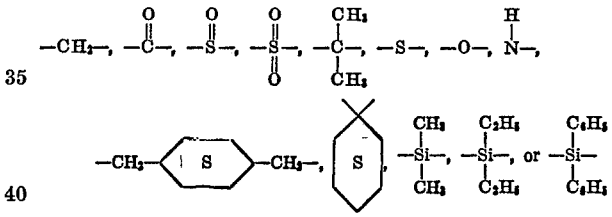

References Cited
UNITED STATES PATENTS

| | | | |
|---|---|---|---|
| 3,567,684 | 3/1971 | Pruckmayr | 260—47 |
| 3,414,543 | 12/1968 | Paufler | 260—47 |
| 3,516,967 | 6/1970 | Funer | 260—47 |
| 3,532,673 | 10/1970 | Bell, Jr. et al. | 260—78 |
| 3,549,594 | 12/1970 | Twilley et al. | 260—47 |

LESTER L. LEE, Primary Examiner

U.S. Cl. X.R.

260—30.2, 30.6 R, 30.8 DS, 31.2 N, 32 A, 32.6 N, 32.8 N, 33.2 R, 47 CP, 49, 63 R, 448.2 B, 448.2 N, 453 R, 456 A, 566 D